US009268495B2

(12) United States Patent
Vogan

(10) Patent No.: US 9,268,495 B2
(45) Date of Patent: Feb. 23, 2016

(54) MANAGING I/O PRIORITIES

(71) Applicant: Apple Inc., Cupertino, CA (US)

(72) Inventor: Andrew W. Vogan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 13/965,109

(22) Filed: Aug. 12, 2013

(65) Prior Publication Data

US 2014/0281050 A1 Sep. 18, 2014

Related U.S. Application Data

(60) Provisional application No. 61/801,446, filed on Mar. 15, 2013.

(51) Int. Cl.
G06F 3/00 (2006.01)
G06F 3/06 (2006.01)
(52) U.S. Cl.
CPC ............ G06F 3/0634 (2013.01); G06F 3/0611 (2013.01); G06F 3/0659 (2013.01); G06F 3/0688 (2013.01)
(58) Field of Classification Search
None
See application file for complete search history.

(56) References Cited

U.S. PATENT DOCUMENTS

| 5,847,857 | A | * | 12/1998 | Yajima et al. | 358/468 |
| 6,442,631 | B1 | * | 8/2002 | Neufeld et al. | 710/107 |
| 2005/0076162 | A1 | * | 4/2005 | Tamura et al. | 710/20 |
| 2010/0082995 | A1 | | 4/2010 | Dees et al. | |
| 2011/0131346 | A1 | | 6/2011 | Noeldner et al. | |
| 2011/0225583 | A1 | * | 9/2011 | Suh et al. | 718/1 |
| 2012/0079174 | A1 | | 3/2012 | Nellans et al. | |

* cited by examiner

Primary Examiner — Henry Tsai
Assistant Examiner — Dean Phan
(74) Attorney, Agent, or Firm — Blakely, Sokoloff, Taylor & Zafman LLP

(57) ABSTRACT

In one embodiment, a memory system for managing priority based Input Output (I/O) command queuing for nonvolatile electrically erasable semiconductor memory comprises one or more banks of electrically erasable semiconductor memory coupled to a storage processor. The storage processor can processes access requests for the memory, and has components including: a command interface, an expectation table, and a mode selector. The command interface receives memory access requests, which include a tag to identify the request, and an external priority associated with the request. The expectation table includes a set of times associated with each of the external priority levels, which indicate the period in which a request having the external priority is expected. The mode selector selects from a set of storage processor operation modes including a standard mode and a preemption mode.

19 Claims, 14 Drawing Sheets

Standard Mode Priority Queues

| | Priority 0 - 440<br>Latency Expectation - T0 | | Priority 1 - 442<br>Latency Expectation - T1 | | Priority 2 - 444<br>Latency Expectation - T2 | | Priority 3 - 446<br>Latency Expectation - T3 | |
|---|---|---|---|---|---|---|---|---|
| | 0 < T0 | | T0 < T1 | | T1 < T2 | | T2 < T3 | |
| | Read | Write | Read | Write | Read | Write | Read | Write |
| Depth 3 | | | | | | | | |
| Depth 2 | | | | | | | | |
| Depth 1 | Task I<br>418 | Task J<br>420 | Task K<br>422 | Task L<br>424 | Task M<br>426 | Task N<br>428 | Task O<br>430 | Task P<br>432 |
| Depth 0 | Task A<br>402 | Task B<br>404 | Task C<br>406 | Task D<br>408 | Task E<br>410 | Task F<br>412 | Task G<br>414 | Task H<br>416 |

*Fig. 4A*

MANAGING I/O PRIORITIES

CROSS-REFERENCE

This application claims the benefit of provisional application Ser. No. 61/801,446 filed on Mar. 15, 2013, which is hereby incorporated herein by reference.

BACKGROUND OF THE DISCLOSURE

Accessing nonvolatile storage has generally been one of the key performance bottlenecks for data processing systems. The advent of storage command queuing was one technological development that, in general was able to improve data processing system perform. However, the queuing mechanisms developed were designed to address specific limitations created by the use of electromechanical hard drives as non-volatile memory for data storage. One specific limitation is that data is rarely read in the order in which it is stored on disk, as applications tend to request data that is scattered throughout all portions of the drive. One method of overcoming the mechanical limitations of an electromechanical hard drive is the use of command queuing, wherein a hard drive accepts multiple commands from a host controller, and then re-arranges those commands to minimize rotational and seek delay.

FIG. 1A is a block diagram of tag based command queuing as is known in the art, in which multiple commands are delivered to a storage device, and the commands are processed or dispatched in a manner that minimized access latencies across the set of commands. A memory buffer region 102 contains data associated with a command, and a set of tags 112 is used to identify each command. In one implementation of tagged queuing, a host controller 110 dispatches commands, which are queued into a command queue 122 for a hard drive 120. The hard drive 120 re-orders the commands in a way that efficiently accesses data on the one or more disk platters 124 upon which the data is stored. When the hard drive 120 is ready to transfer data associated with a command, the tag for the command is communicated to the host controller 110. The host controller 110 can then set up a direct memory transfer (DMA) between the hard drive 120 and the memory buffer region 102 which is store data transferred from the hard drive 120, or which stores data which will be transferred to the hard drive 120.

FIG. 1B is an illustration of the rotating disk platter 124 which has a clockwise rotation 126, and which will access data for Task A 152, Task B 132, Task C 162, and Task D 142. Notwithstanding the dispatch order of the commands, the commands will be accessed in the manner that reduces the overall latency for the set of commands, as the disk platter 124 rotates, and the data is accessed by the Read/Write head 128 of the hard drive. Hard drive based command queuing systems have limitations, however. The order in which commands are completed is largely a function of the physical placement of the data on the storage medium, so specifying a priority system in which commands should be serviced may result in an overall increase of system latency over a set of commands. Moreover, rotation and seek optimized command queuing systems provide no benefit when accessing semiconductor based nonvolatile storage.

SUMMARY OF THE DESCRIPTION

In one embodiment, a memory system for managing priority based Input Output (I/O) command queuing for non-volatile electrically erasable semiconductor memory comprises one or more banks of electrically erasable semiconductor memory coupled to a storage processor. The storage processor can process access requests for the memory, and has components including: a command interface, an expectation table, and a mode selector. The command interface receives memory access requests, which include a tag to identify the request, and an external priority associated with the request. The expectation table includes a set of times associated with each of the external priority levels, which indicate the period in which a request having the external priority is expected. The mode selector selects from a set of storage processor operation modes including a standard mode and a preemption mode.

In one embodiment, as memory access requests are received by the command interface, they are placed in a queue associated with the external priority of the request. Each external priority can have a separate queue. A request can have an internal priority in addition to the external priority. The internal priority can be used, for example, to prioritize a read command of an external priority higher than a write command of the same external priority. In one embodiment, the internal priority can be used to prioritize requests that have been pending longer than expected over requests that have not been pending for a relatively shorter period of time, in relation to other commands of the same priority level.

In one embodiment, the expected latency of commands can be managed via the use of an expectations table. The expectation table includes an expected period for completion for requests of each external priority level, with higher priority levels having shorter expectation periods than lower priority levels. In one embodiment, the expectation table is updateable by a device driver associated with the storage processor. The expectation table can be statically upgraded from time to time based on performance tuning heuristics, or can be dynamically updated based on system conditions.

In one embodiment, storage processor operational modes include a standard operational mode, in which the storage processor addresses each available queue sequentially, and handles the request, if any, at the head of each queue. In one embodiment, the order in which each queue is processed is based on the priority of the queue, and an embodiment can process read requests having an external priority before write requests of the same external priority. In one embodiment, read requests and write requests of each external priority have separate queues. In one embodiment, each queue is processed based on the internal priority, and each internal priority has separate queues, where read requests of an external priority have a higher internal priority than a write request of the same external priority.

In one embodiment, storage processor operational modes include a preemption operational mode, in which the storage processor addresses each available queue sequentially, and only handles a request if the request has exceeded its expectation period. In one embodiment, tasks which have been pending for longer than their expectation period attain a higher internal priority than tasks that have been pending for less than their expectation period. In one embodiment, each task at the head of a queue that has exceeded its expectation period is processed before any other tasks that have not exceeded their respective expectation periods.

In one embodiment, the storage processor includes a mode selector, which selects from the set of operational modes of the storage processor. In one embodiment, the storage processor receives a periodic interrupt, which causes the mode selector to assess the current operational mode of the storage processor. Responsive to the interrupt, the mode selector can select an operational mode from the set of operational modes corresponding to a set of system conditions at the time the interrupt is received. In one embodiment, the mode selector selects the pre-emption mode if the depth of a queue grows beyond a certain size or there are a certain number of requests that have exceeded their expectation period.

In one embodiment, non-transitory computer-readable medium stores instructions for managing the memory system as described herein, and which includes operations for updating the expectation table of the storage processor.

Other features of the various embodiments will be apparent from the accompanying drawings and from the detailed description, which follows.

The above summary does not include an exhaustive list of all aspects of the various embodiments. It is contemplated that the invention includes all systems and methods that can be practiced from all suitable combinations of the various aspects summarized above, and those disclosed in the Detailed Description below.

BRIEF DESCRIPTION OF THE DRAWINGS

The following description includes discussion of figures having illustrations of example implementations of the various embodiments. Accordingly, the figures should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein each describe various embodiments and implementations of the invention, and do not necessarily all refer to the same embodiment, though embodiments are not necessarily mutually exclusive. In the accompanying figures, like references indicate similar elements.

FIG. 4A is an illustration of an embodiment of a command queuing system as utilized in an embodiment of a memory controller in which standard mode priority queuing is in effect.

DETAILED DESCRIPTION

Various embodiments of a command queuing system for nonvolatile semiconductor based memory, and a memory system employing such command queuing system, are described herein. The command queuing system provides benefits to solid-state memory devices, including nonvolatile electrically erasable semiconductor memory, by providing a tag based, prioritized command queuing system in which commands can be associated with an "expectation period," in which commands are expected, but not guaranteed, to be completed. Numerous specific details are described herein to provide a thorough understanding of various embodiments. However, in certain instances, well-known or conventional details are not described in order to provide a concise discussion of embodiments of the various embodiments.

Figure 1A:
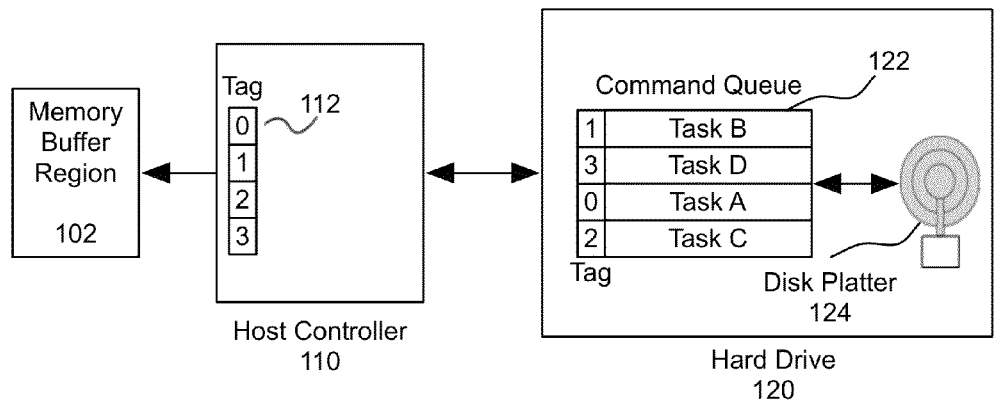
FIG. 1A is a block diagram of an implementation of tag based command queuing, as is known in the art.
Figure 1B:
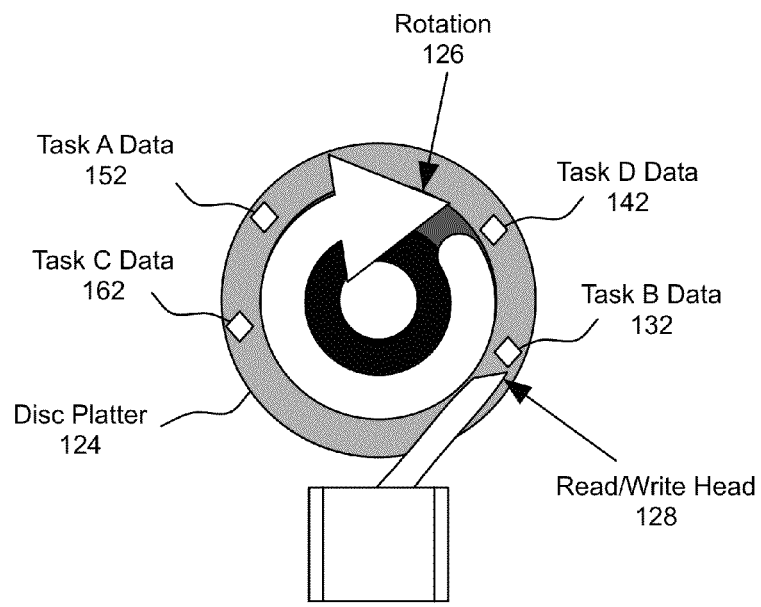
FIG. 1B is an illustration of a rotating disk platter, as is known in the art.
Figure 2:
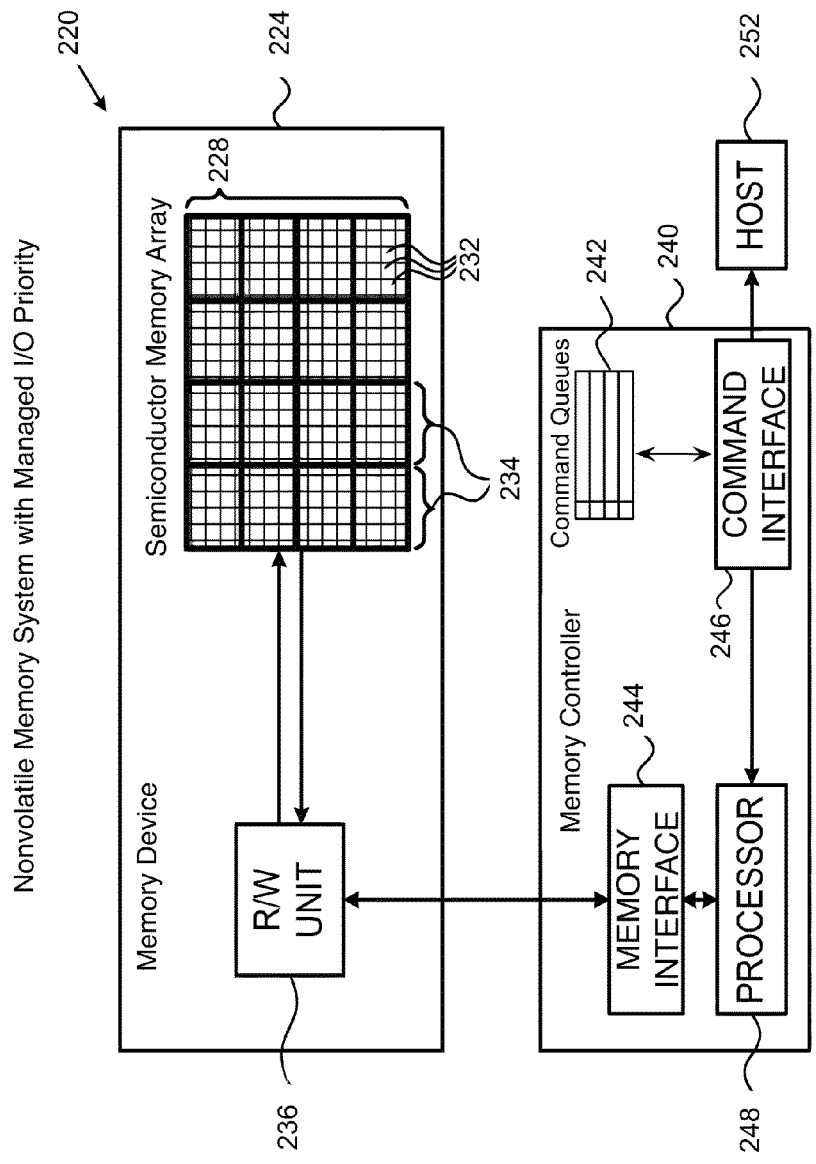
FIG. 2 is a block diagram of a nonvolatile memory system with managed I/O priority, according to an embodiment.

FIG. 2 is an illustration of a nonvolatile memory system capable of implementing managed I/O priority, according to an embodiment. The nonvolatile memory system 220 can be used in various host systems and devices, such as in computing devices, cellular phones, media players, smartphones, tablet computers, or other computing or communication terminals. Additionally, an embodiment of the memory system can be included in Solid State Disks (SSD), or hybrid data storage devices which include a hard disk drive (HDD) and one or more SSDs. The nonvolatile memory system 220 illustrated is an exemplary system configuration of semiconductor-based memory for which rotation based command queuing is inapplicable. Elements that are not necessary for understanding the priority based command queuing system described herein, such as various interfaces, addressing circuits, timing and sequencing circuits and debugging circuits, have been omitted from the figure for clarity.

The nonvolatile memory system 220 includes a memory device 224, which stores data in a memory cell array 228. The memory array comprises multiple semiconductor memory blocks 234, which each can include multiple memory cells 232. The memory array 228 can comprise NAND, or NOR flash memory using floating gate MOSFETs, or charge trap flash, or any other form of nonvolatile semiconductor memory. The memory device 224 includes a reading/writing (R/W) unit 236, which converts access requests to the memory device into the specific memory block 234 access requests. When reading data out of array 228, R/W unit 236 converts the stored values in the memory cells 232 into digital samples.

A memory controller 240 performs storage and retrieval of data to and from the memory device 224. The memory controller includes a memory interface 244 for communicating with the memory device 224, and a storage processor 248 that carries out the various memory management functions. The memory controller 240 communicates with a host device 252, via a command interface 246, to accept data for storage in the memory device and to output data retrieved from the memory device. One or more command queues 242 can be included in the memory controller 240, and can be stored in a bank of internal memory in the memory controller 240, or can be stored in system memory on the host 252, as configured by a memory controller driver component of an operating system executing on the host 252.

A section of internal or system memory can be used by the memory controller 240 to store multiple command queues 242. The command queues 242 can be used by the memory controller 240 to sort incoming commands by priority before dispatching the commands to the storage processor 248. The memory associated with the command queues 242 can also be used as an input command buffer, to queue or batch commands previously sorted by priority, before those commands are processed by the storage processor 248.

To track the individual I/O requests, incoming I/O operations received at the command interface 246 of the memory controller 240 can be tagged with an "external" priority level, which reflects the relative priority of the I/O requests as determined by the higher levels of abstraction. The external priority level can be use to determine an "internal" priority level based on various criteria as determined by the memory controller 240. The number of priorities, and the number of priority queues, can vary, and can be independent of the number of priority levels utilized by the storage I/O components that are external to the memory controller.

In one embodiment, the maximum expected latency of commands are managed via the use of an expectation stable. The expectation table includes an expected period for completion for requests of each external priority level, with higher priority levels having shorter expectation periods than lower priority levels. In one embodiment, the expectation table is updateable by a device driver associated with the storage processor. The expectation table can be statically upgraded from time to time based on performance tuning heuristics, or can be dynamically updated based on system conditions. Each priority level can have a corresponding entry in an expectation table, which defines an expected period of completion for requests of the priory level. The expectation table includes an expected period for completion for requests of each external priority level, with higher priority levels having shorter expectation periods than lower priority levels. In one embodiment, the expectation table is updateable by a device driver associated with the storage processor. The expectation table can be statically upgraded from time to time based on performance tuning heuristics, or can be dynamically updated based on system conditions.

In one embodiment, the storage processor 248 of the memory controller 240 has several operational modes, including a standard operational mode, and a preemption operational mode. In the standard operational mode, the storage processor addresses each available priority queue sequentially, and handles the request, if any, at the head of each queue. In the preemption operational mode, the storage processor addresses each available queue sequentially, but only handles a request if the request has exceeded its expectation period. Other operational modes are also possible. In one embodiment, tasks which have been pending for longer than their expectation period attain a higher internal priority than tasks that have been pending for less than their expectation period. In one embodiment, each task that has exceeded its expectation period is processed before any other task that has not exceeded its expectation period. The operational modes can be transitioned based on criteria such as the average pendency of the various I/O operations, the queue depths of one of more of the priority sorted command queues 242, or via an external interrupt sent to the memory controller 240 by the host 252.

Figure 3:
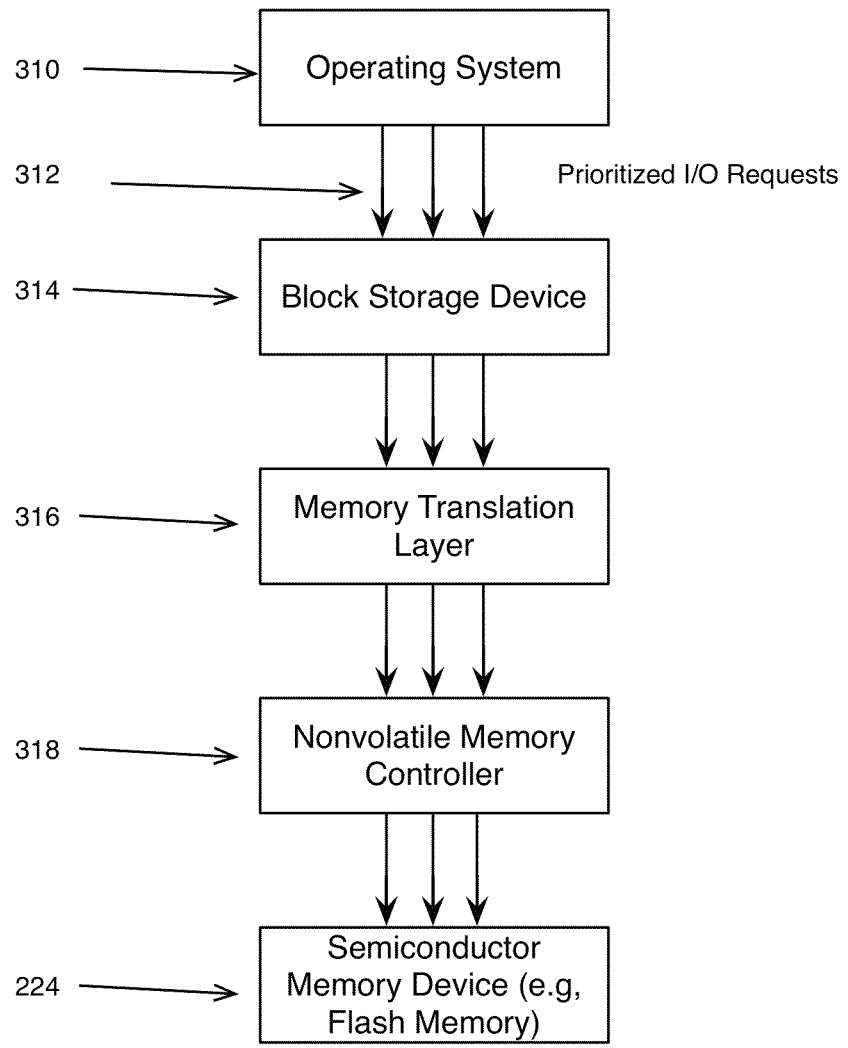
FIG. 3 is a block diagram illustrating a data processing system utilizing system wide managed I/O priority, according to an embodiment.

FIG. 3 is a block diagram illustrating a data processing system utilizing system wide managed I/O priority 300. In one embodiment, components of the memory system 220 of FIG. 2 are included in the storage components of a data processing system. The I/O infrastructure of the data processing system includes multiple user applications of varying priority levels, which are managed by an operating system 310. The data processing system manages I/O priority system wide, such that the priority data associated with I/O requests is maintained. For example, the operating system 310 can assign and manage the priority given to specific I/O requests, and prioritized I/O requests 312 can be sent to the underlying storage infrastructure. A block storage device 314 can include software based priority queues, in which block level I/O requests are serviced based on request priority. The data processing system utilizes an embodiment of the semiconductor memory 224 of FIG. 2 as a storage device 320, and in one embodiment, a memory translation layer 316 is used to abstract the semiconductor memory control interface of the storage controller 318 to the block storage device 314. An embodiment of the storage controller 318 can utilize one or more components of the memory controller 240 of FIG. 2, including the storage processor 248. Each of these components can be configured to manage the assigned priority level for the various I/O requests until the requests are serviced by the underlying hardware.

During system operation, the various processes and applications executing on the operating system 310 are dispatched with various priority levels. In one embodiment, applications can have a high, a medium, or a low priority, although greater or fewer priority levels are possible. The I/O priority of a specific request can be communicated to the nonvolatile memory controller 318, which can include multiple priority queues for managing the various incoming I/O requests. To enhance the user experience presented to a user of an electronic device incorporating the described components, a maximum expected latency for operations of each of the various priority levels is determined. The maximum expected latency is a period of time in which the system expects an operation to be completed. The system does not ensure or guarantee that commands will be serviced within this maximum expected latency period, but affirmative action is taken to minimize the amount of time I/O operations that are critical to the user experience are pending, to enhance the overall feel of system responsiveness as experienced by the user.

FIG. 4A is an illustration of one embodiment of a command queuing system as utilized in an embodiment of a memory controller (e.g., the memory controller 240 of FIG. 2) in which standard mode priority queuing is in effect. In the standard operational mode, the storage processor addresses each available priority queue sequentially, and handles the request, if any, at the head of each queue. As depicted in FIG. 4A, I/O operations of varying priority (e.g., Task A 402 through Task P 432) are enqueued in the prioritized command queues of the memory controller. Incoming operations can be provided with tag data, which can be used to uniquely identify the operation, as well as provide metadata concerning the operation, including the external priority of the operation. When an operation on the storage memory system is completed, the tag identifier associated with the operation can be used to notify host system.

The number of priorities and priority queues can vary, and can be independent of the number of priority levels utilized by the storage I/O components that are external to the memory controller. In the exemplary command queuing system of FIG. 4A, four priority levels are enabled. Each priority level can have a corresponding entry in an expectation table, which defines an expected period of completion for requests of the priory level. In the standard operational mode, the order in which each queue is processed is based on the priority of the queue, with high priority operations (e.g., priority zero 440) being processed before low priority operations (e.g., priority three 446). During processing, the head of each priority queue can be examined, and the task at the front of the queue can be removed from the priority queue and placed in a command buffer to be dispatched to the storage processor.

In one embodiment, priority level zero 440 is the lowest priority level and has an associated latency expectation T0. The next lower priority level is priority one 442, which has a latency expectation of T1. The next lower priority level is priority two 444, which has a latency expectation of T2. The lowest priority level depicted is priority three 446, which has a latency expectation of T3. Latency expectation T0 is the lowest expectation. The system generally expects operations at priority zero 440 to be completed in less than T0 time. Latency expectation T1 for priority one 442 operations is longer than the latency expectation T0 of priority zero 440 operations. The latency expectation T2 for priority two 444 operations is longer than the latency expectation T1 for priority one 442 operations. Likewise, the latency expectation T3 for priority three 446 operations is the longest latency expectation.

The system can be tuned to favor operations having a greater impact on perceived system latency, such that accesses to nonvolatile memory are performed in a manner that enhances the overall user experience. For example, in one embodiment, an incoming operation with a request to read data stored in the memory system is processed before a write operation of the same priority. In one embodiment, read requests and write requests of each external priority have separate queues. In one embodiment, each queue is processed based on the internal priority as determined by the memory controller. As part of the internal prioritization process, read requests of an external priority can be assigned a relatively higher internal priority than a write request having the same external priority.

Accordingly, an embodiment can process Task A 402, which is a priority zero 440 read command, before processing task B 404, which is a priority zero 440 write command. Continuing with queue processing under the standard mode, the head of each successive queue is processed in order. Task C 406 is processed before Task D 408, each task of priory one 442. Task E 410 is processed before Task F 412, each task of priority two 444. Subsequently, task G 414 is processed prior to Task H 416, each task of priority three 446. Once the head of each priority queue is processed, the standard mode of operation returns to the queue for the highest priority (e.g., priority zero 440) and processes each task. In the second pass depicted, Task I 418 though Task P 432 would be processed if the storage processor remained in the standard mode.

Figure 4B:
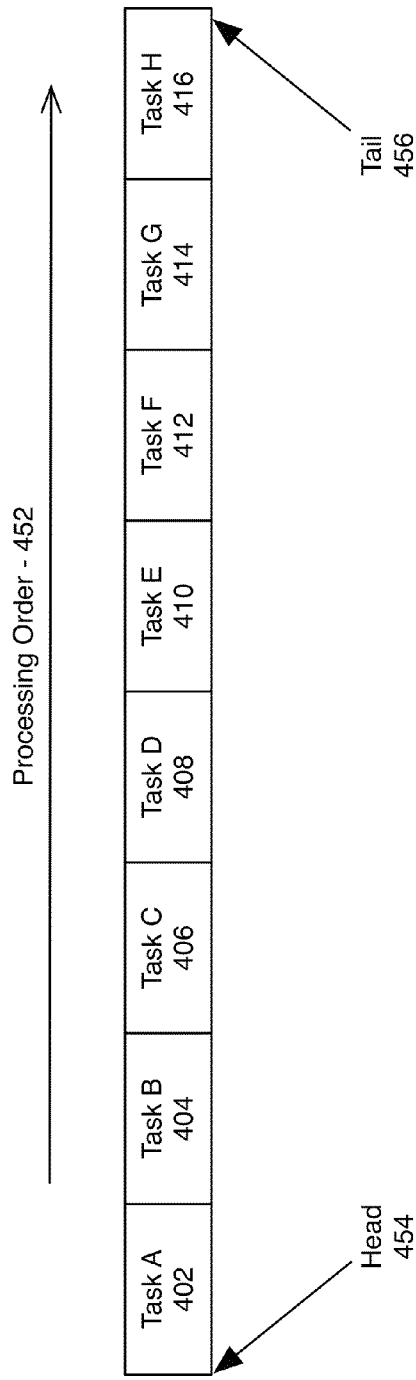
FIG. 4B is an illustration of a storage processor input command buffer in standard mode, according an embodiment.

FIG. 4B is an illustration of a storage processor input command buffer in standard mode, according an embodiment. In one embodiment, as I/O operations having tag IDs corresponding to Task A 402 though Task H 416 are processed, commands associated with those tags are dispatched to the storage processor. The storage processor can have an incoming command buffer from which it processes incoming commands. An embodiment of the storage processor input command buffer when in standard mode is loaded with I/O operations in order of priority, such that the Task A 402 read operation is loaded into the first in first out (FIFO) standard mode command buffer, followed by each successive I/O operation from the head of each priority queue.

In one embodiment, a tail pointer 456 increments down the queue to point to free space in the queue as the I/O operations are placed in the command buffer. A head pointer 454 points to the next command to be processed by the storage processor, and each I/O operation is processed by the storage processor in the depicted processing order 452 from the head pointer 454 to the tail pointer 456. Commands can be processed from the head 454 of the buffer while new commands are added to the tail of the buffer 456. If new commands are added to the buffer faster than the storage processor can process the buffered commands, the buffer can become full. Accordingly, an I/O operation backlog can develop as I/O operations in the priority queues await the assignment of their associated commands to the input command buffer of the storage processor. The I/O operation backlog can be assessed by the queue depth for a given priority queue. As the queue depth of a priority queue increases, applications or processes waiting on those operations can begin to perceive increased I/O latency.

To limit the I/O latency perceived by operations that are critical to the user experience of a device, the storage processor can switch to an alternate processing mode to address specific I/O operations out of standard order. In one embodiment, the storage processor can switch to a preemption operational mode, in which only the I/O operations that have exceeded their expectation period are processed.

Figure 5A:
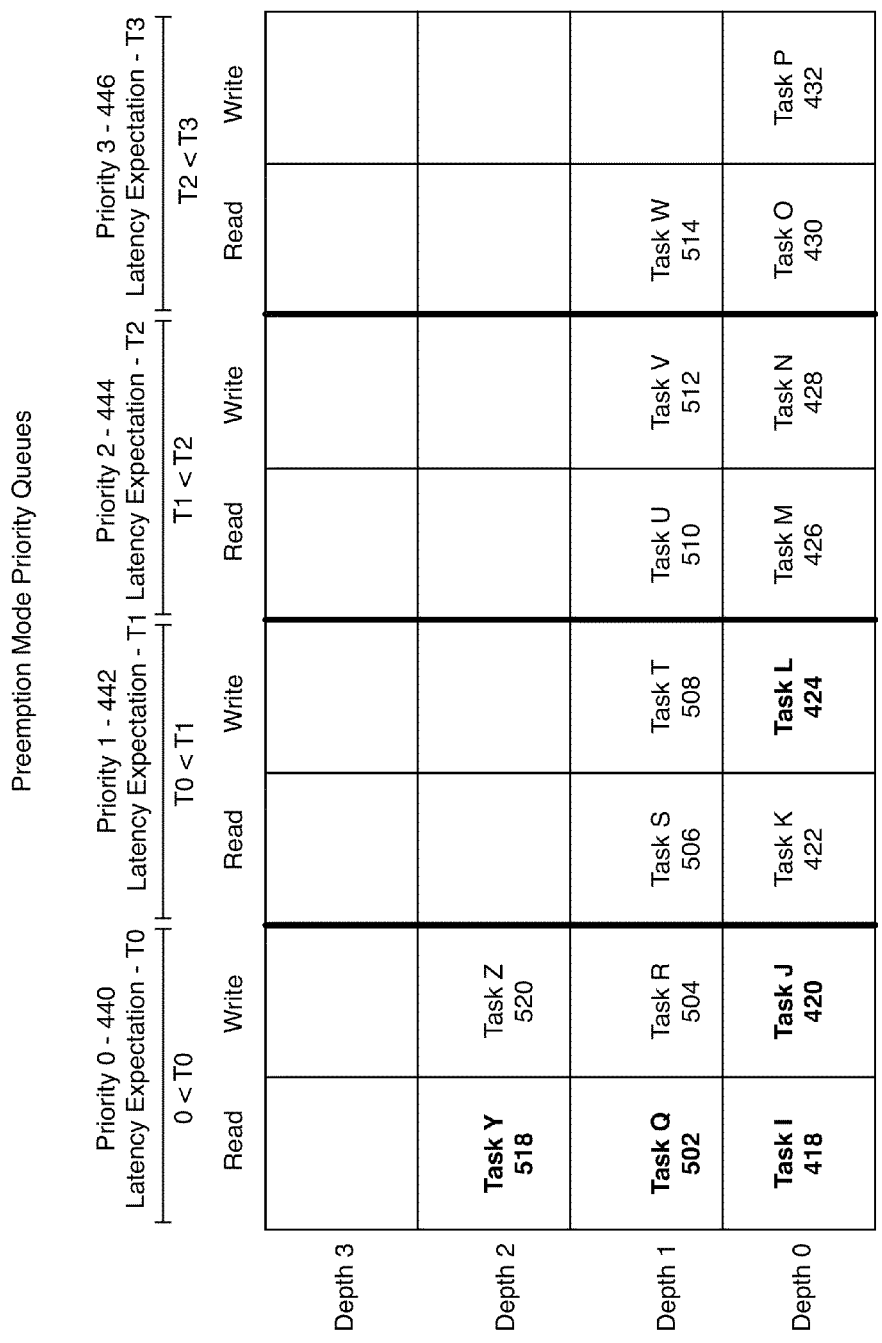
FIG. 5A is an illustration of an embodiment of a command queuing system as utilized in an embodiment of a memory controller in which preemption mode priority queuing is in effect.

FIG. 5A is an illustration of one embodiment of a command queuing system as utilized in an embodiment of a memory controller (e.g., the memory controller 240 of FIG. 2) in which preemption mode priority queuing is in effect. In one embodiment, each I/O operation at the head of a queue that has exceeded its expectation period is processed before any other I/O operations that have not exceeded their respective expectation periods. Accordingly, as the head of each priority queue is examined, the pendency of each task is assessed, and only tasks that have exceeded their latency expectation are dispatched to the storage processor.

The exemplary queues depicted in FIG. 5A are an illustration of the queues of FIG. 4A in which task A 402 through task H 416 have been dispatched to the storage processor. In the intervening period, several new I/O operations have arrived at the memory controller, causing the queue depth of the priority queues increase. The increased priority queue depth results in a switch to preemption mode. In normal mode, Task I 418 through Task P 432 would be processed successively, however, only Task I 418 and Task J 420 have exceeded the short latency expectation T0 for priority zero 440 operations. Accordingly, Task I 418 and Task J 420 are dispatched to the storage processor. Task K 422 is assessed, but not dispatched, because its pendency is less than the latency expectation T1 for priority one 442 operations. Alternatively, Task L is dispatched because that task has been pending longer than the latency expectation T2 for priority two 444 operations. Task M 426, Task N 428, Task O 430, and Task P 432 can be assessed in turn, but will not be dispatched because they have not been pending longer than the latency expectation for their respective priority.

In one embodiment, preemption mode remains in effect until the heads of each queue are free of operations that have exceeded the respective latency expectation of the priority. A second iteration through the various priority queues can begin again at priority zero 440, which will find Task Q 502 at the head of the priority zero read queue. In this instance, Task Q 502 has exceeded the latency expectation T0 of priority zero 440, and is dispatched. Task R 504, Task S 506, Task T 508, Task U 510, Task V 512, and Task W 514 can be examined, but will not be dispatched because they have not exceeded the latency expectation for the respective priority of each task. Subsequently, Task Y 518 will be positioned at the head of the priority zero 440 read queue, and, having a pendency which exceeds the latency expectation T0 of priority zero 440, Task Y 518 can be dispatched. Accordingly, commands associated with Task Y 518 can be added to the input command buffer of the storage processor, and Task Y 518 can be removed from the priority queue.

Figure 5B:
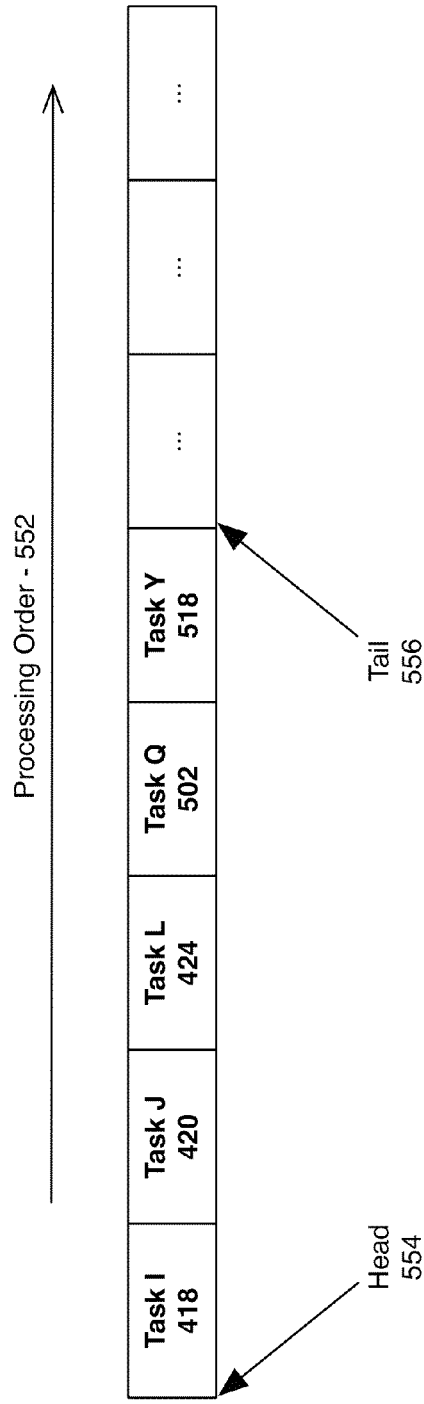
FIG. 5B is an illustration of a storage processor input command buffer in preemption mode, according an embodiment.

FIG. 5B is an illustration of a storage processor input command buffer in preemption mode, according an embodiment. In preemption mode, the I/O operations having tag IDs corresponding to Task I 418 though Task Y 518 are processed before other tasks in the priority queues because those tasks have exceeded the expected latency for their respective priority. Subsequently, an embodiment of the storage processor input command buffer is loaded only with I/O operations that have exceeded their expected pendency. In this instance, the head pointer 554 indicates that one or more commands associated with Task I 418 will be processed next, followed by command for Task J 420, Task L 424, Task W 502, and Task Y 518. The Tail pointer 556 indicates where commands for an additional task may be placed in the command buffer. New commands placed at the tail pointer 556 will be executed by storage processor after the previously enqueued commands in the storage processor input command buffer.

Figure 6A:
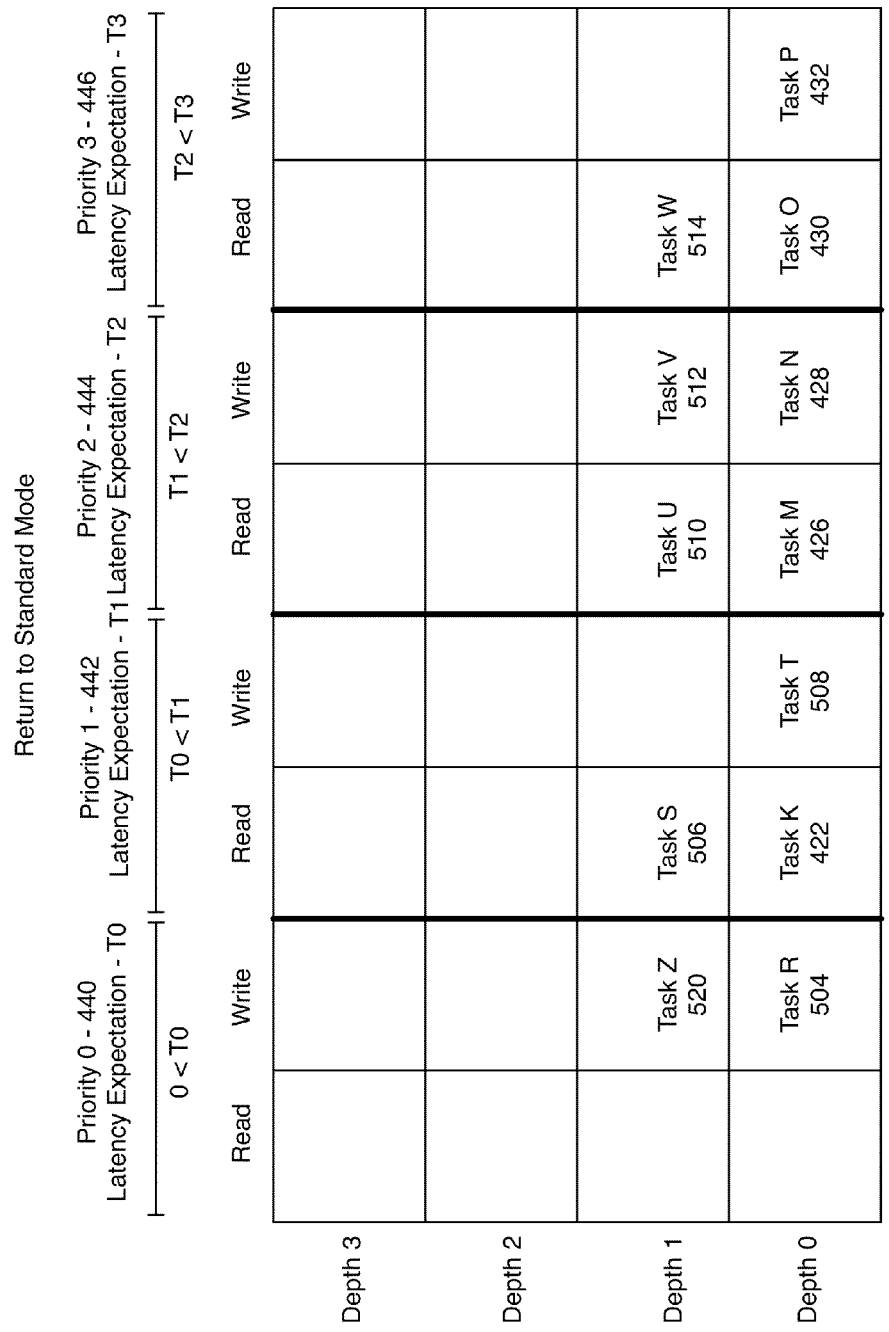
FIG. 6A is an illustration of an embodiment of a command queuing system as utilized in an embodiment of a memory controller in which preemption mode transitions to standard mode.

FIG. 6A is an illustration of a command queuing system as utilized in an embodiment of a memory controller (e.g., the memory controller 240 of FIG. 2) in which preemption mode transitions to standard mode. An embodiment, having processed the tasks associated with I/O operations that were pending longer than their respective latencies, can switch back to standard mode once the tardy tasks are dispatched. In this instance, the heads of the respective priority queues can be examined, and it will be discovered that no tasks remain which have exceeded the latency expectation for their respective priority. For example, the memory controller can examine the head of the read queue for priority zero 440, to discover the queue empty. Subsequently, the queues can be examined such that Task R 504, Task K 422, Task T 508, Task M 426, Task N 428, Task O 430, and Task P 432 are each assessed, to find that none of the tasks have a pendency exceeding the latency expectation for their respective priority. In one embodiment, a full cycle of the available priority queues triggers the storage processor to switch to the standard mode of operation.

Figure 6B:
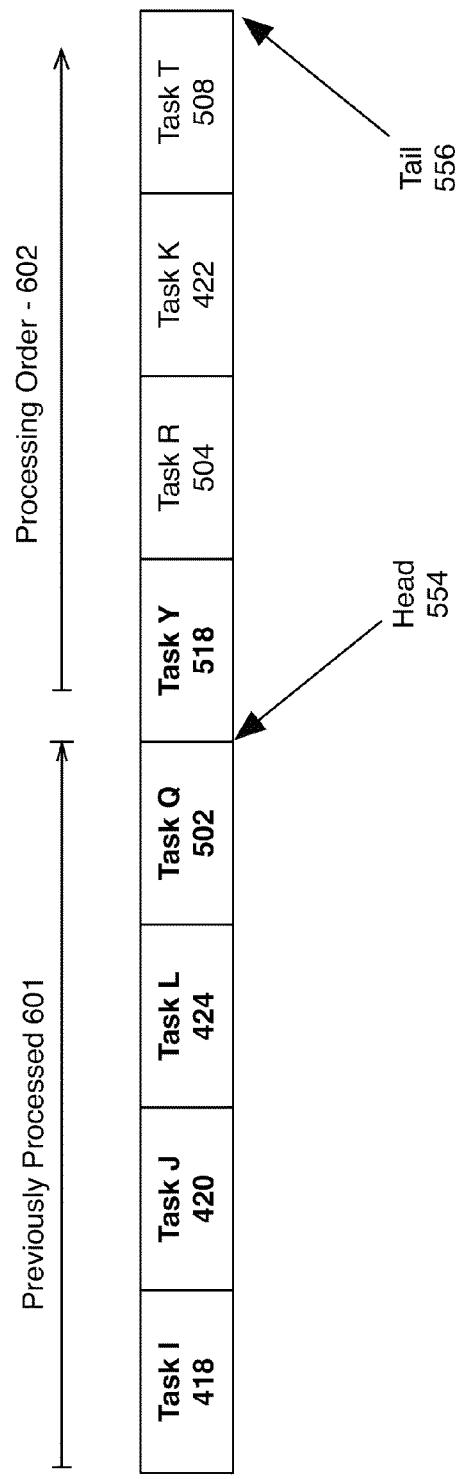
FIG. 6B is an illustration of a storage processor input command buffer after transitioning from preemption mode to standard mode, according an embodiment.

FIG. 6B is an illustration of a storage processor input command buffer after transitioning from preemption mode to standard mode, according an embodiment. An embodiment of the storage processor can utilize a circular command buffer, and continue to process commands associated with queues are assessed and the operational mode is assessed or transitioned. Accordingly, a set of previously processed 601 commands associated with Task I 418, through Task Q 502 can still be in the input command buffer. As the commands are processed, the head pointer 554 moves past the commands to select the next command or set of commands to be processed. In the command buffer depicted, Task Y 518, which was loaded into the command buffer during preemption mode operations, can be processed next. Additional commands that have been added after switching back to standard mode can be processed in the FIFO processing order 602, such that Task R 504 is processed before Task K 422, which is processed before Task T 508. In this instance, the tail pointer 556 will point to empty memory space located beyond the commands associated with Task T 508.

FIGS. 7-10 are flowcharts illustrating exemplary logic that can be employed to implement the various priority queue operations and mode switches described herein. The processes depicted in the figures that follow can be performed by processing logic comprising hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 7:
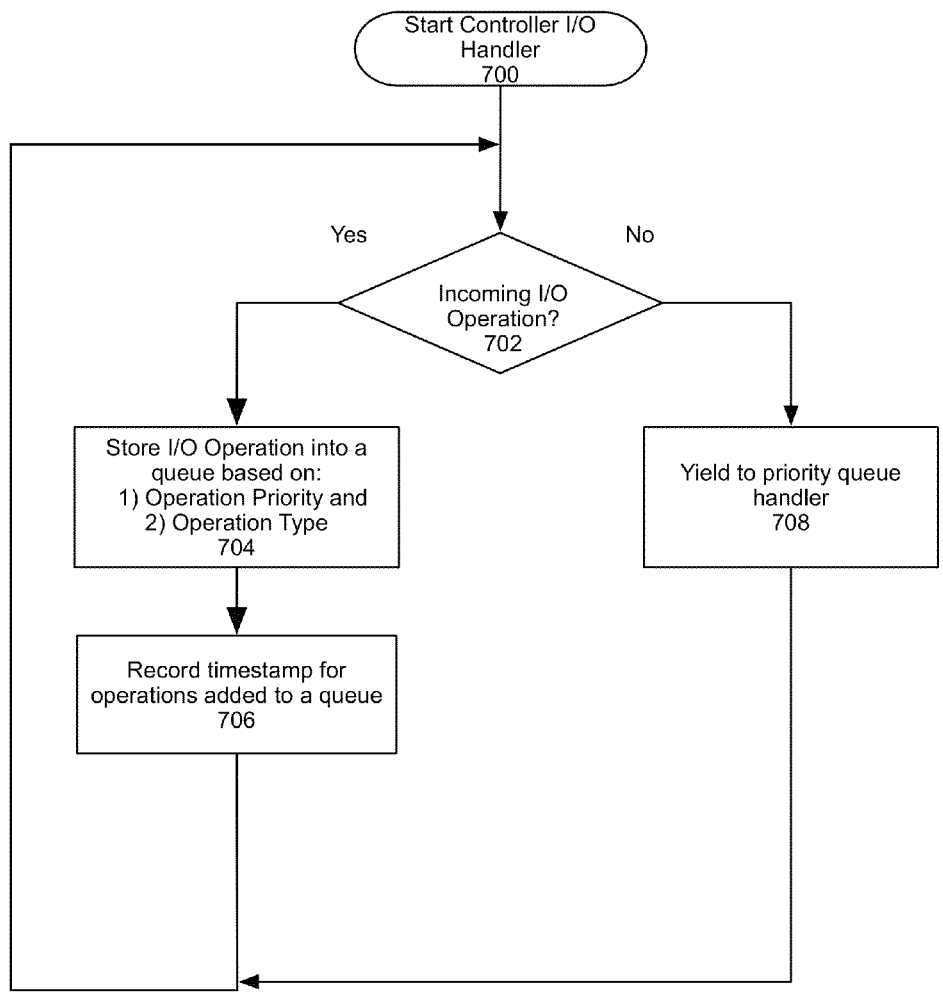
FIG. 7 is a flow diagram of control logic to handle incoming I/O operations at a nonvolatile memory controller, according to an embodiment.

FIG. 7 is a flow diagram of control logic to handle incoming I/O operations at a nonvolatile memory controller, according to an embodiment. An embodiment of the memory controller 240 of FIG. 2 can start a controller I/O handler 700 when the memory controller is prepared to accept incoming processes. The I/O handler logic can be implemented in several ways. For example, the I/O handler can be a thread or process executing on the host processor of the device, can be instructions executed by an embedded microcontroller of the memory controller, or can be instructions executed by the storage processor. The I/O handler can perform logic 702 to check for an incoming I/O operation at an input buffer of the memory controller. If no I/O operations are available to be processed, the I/O handler can execute logic 708 to yield to the storage processor priority queue handling process, or otherwise suspend processing until incoming I/O operations are available.

If at logic block 702, the controller I/O handler finds one or more incoming I/O operations, execution proceeds to logic block 704, in which the one or more incoming I/O operations are placed in the appropriate queue using criteria including the priority of the operation and the type of operation. In one embodiment, each priority level has a separate queue. In one embodiment, read operations and write operations of the same priority level are placed in separate queues, and read operations have a higher relative priority within the memory controller than write operations of the same incoming priority. Once the operations are placed in the appropriate queue, the I/O handler can record 706 a timestamp for the time when the one or more operations are added to the priority queues.

Figure 8:
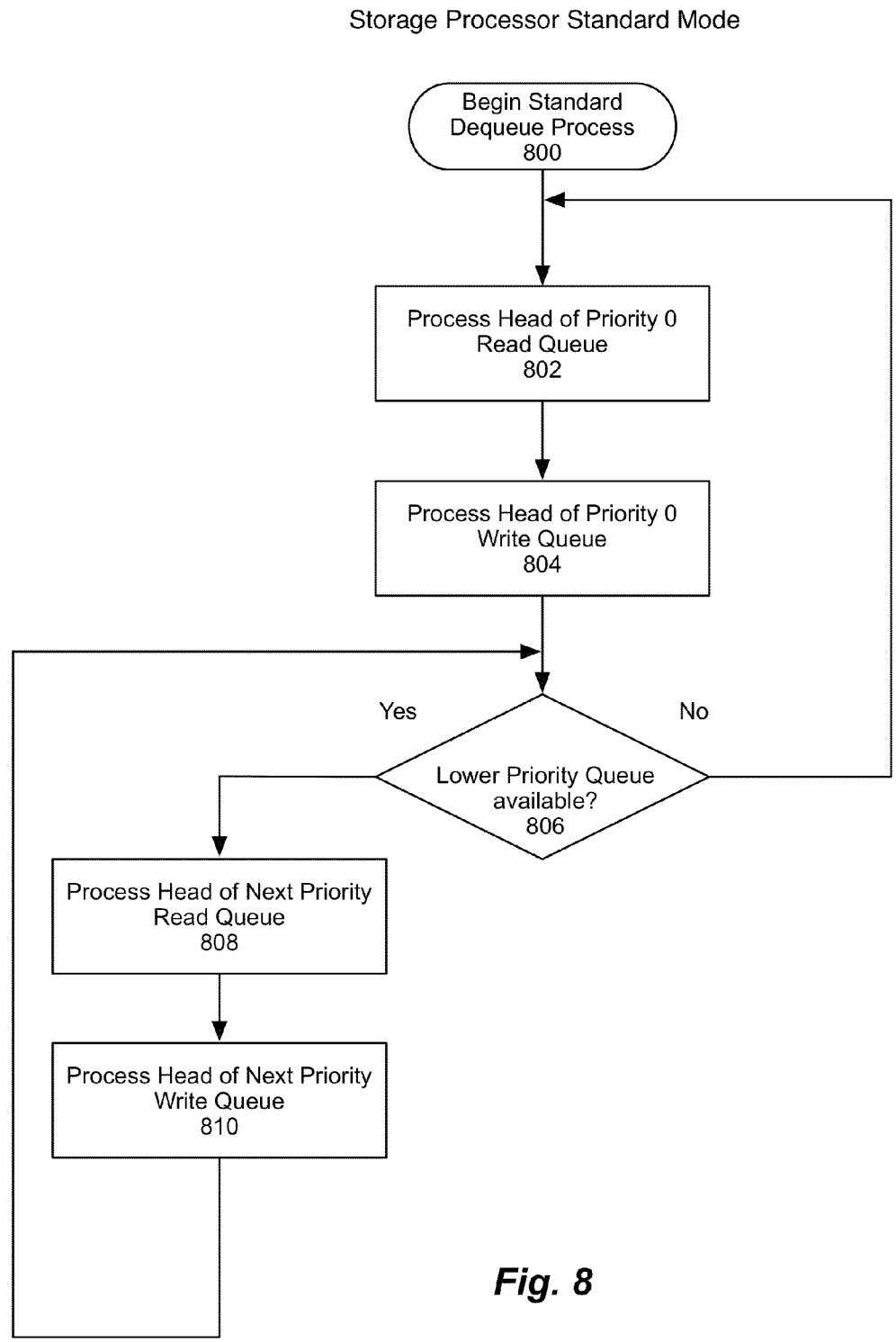
FIG. 8 is a flow diagram of control logic for the standard mode of operation for the memory controller storage processor, according to an embodiment.

FIG. 8 is a flow diagram of control logic for the standard mode of operation for the memory controller storage processor, according to an embodiment. At the beginning 800 of each cycle of the standard mode dequeue process, the storage processor can perform an operation 802 to process the head of the first priority queue. In one embodiment, at least one priority queue is available, which has separate queues for read operations and write operations at the at least one priority level. In the exemplary control logic depicted, the first priority queue is the priority 0 read queue, and any I/O operations at the head of that queue can be dispatched to the storage processor. Processing can then proceed to the next queue, where logic 804 to process the head of the priority 0 write queue is performed. In one embodiment, the number of priority queues corresponding to an external priority is dynamic. Accordingly, operation 806 is performed after processing the first set of queues to determine if any additional lower priority queues are available. If so, an operation 808 to process the head of the next priority queue can be performed. In this instance, the next priority read queue is processed, followed by an operation 810 to process the head of the next priority write queue. When, at 806, it is determined that no additional lower priority queues are available to process, execution can return to operation 802 to process the head of the highest priority queue.

Figure 9:
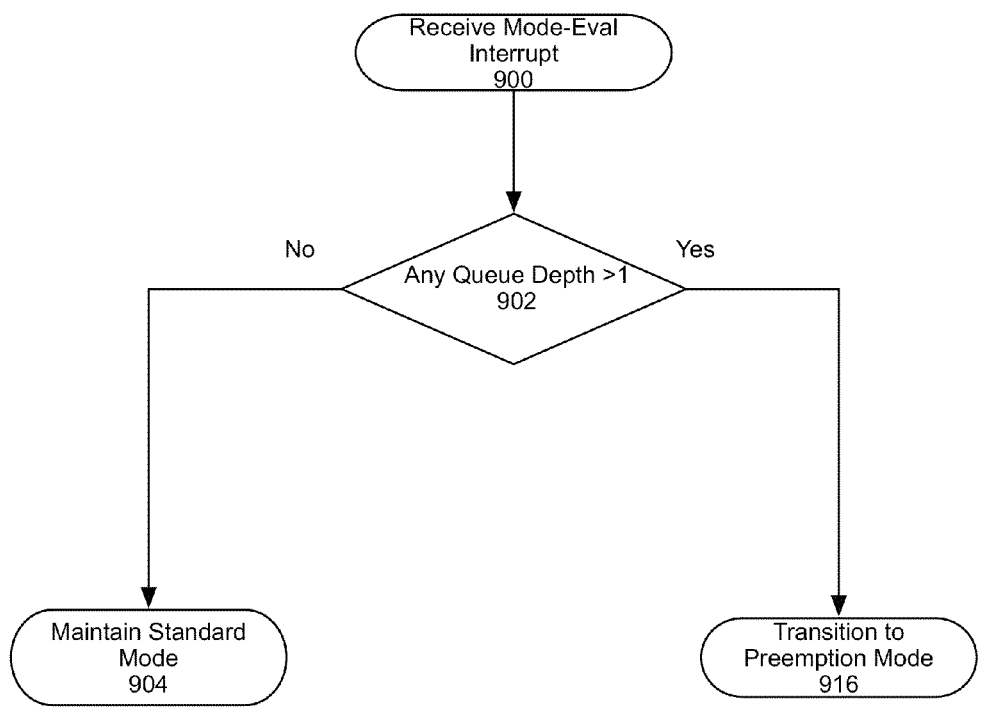
FIG. 9 is a flow diagram of control logic to assess an operational mode switch, according to an embodiment.

FIG. 9 is a flow diagram of control logic to assess an operational mode switch, according to an embodiment. Multiple methods of determining a mode switch from the standard operational mode to, for example, the preemption operational mode. In one embodiment, an interrupt based mode evaluation method is used, in which the memory controller receives 900 a periodic interrupt, and performs and operation 902 to assess the queue depth of each of the priority queues. If the queue depth is less than or equal to one, the storage processor remain in standard mode, as shown at 904. If any queue has a depth that is greater than one, the storage processor can transition to preemption mode.

Figure 10:
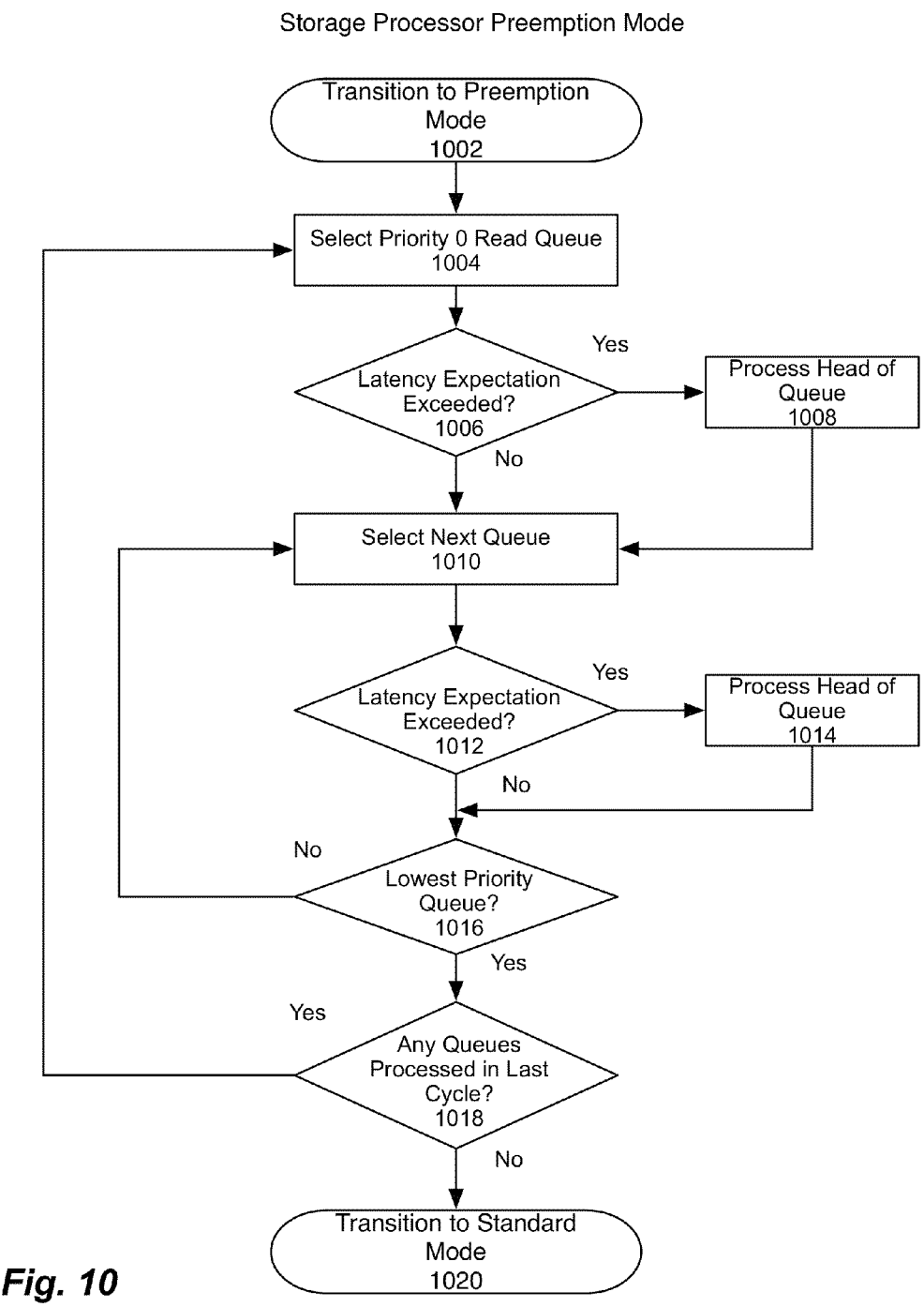
FIG. 10 is a flow diagram of control logic for the storage processor preemption mode, according to an embodiment.

FIG. 10 is a flow diagram of control logic for the storage processor preemption mode, according to an embodiment. Once the storage processor transitions to preemption mode 1002, an operation 1004 to select the first of the priority queues is performed, which, in the exemplary logic of FIG. 10, is the read queue for priority 0. Next, an operation 1006 to determine if the latency expectation for the task at the head of the priority queue has been exceeded. If the task has been pending for longer than the latency expectation associated with the priority, an operation 1008 to process the head of the queue is performed, in which one or more commands associated with the task can be placed into the input command buffer for the storage processor.

If the task has not exceeded the latency expectation for priority, then the task is not processed, and execution proceeds to select 1010 the next queue. In one embodiment, the next queue is the priority 0 write queue, and if the latency expectation for the task at the head of the queue has been exceeded, an operation 1014 to process the head of the queue can be performed. Once the operation 1014 is complete, or if in operation 1012 it is determined that the latency expectation has not been exceeded, an embodiment can perform an operation 1016 to determine if the most recently selected queue is the lowest priority queue. If the most recently selected queue is not the lowest priority queue, such that an additional queue, or set of queues corresponding to a lower priority is available, an operation 1010 to select the next queue is performed, and the logic can proceed through the operations to process each of the remaining queues.

When no additional queues are available, an operation 1018 can be performed to assess if any queues were processed in the last cycle. If at least one task from at least one queue was processed, execution can proceed to the operation 1004 that selects the highest priority queue, and each queue is examined for tasks that have exceeded the latency expectation for the respective priority of the task. Once a complete cycle is passed in which no tasks from any of the queues are processed, an operation 1020 to transition to standard mode can be performed.

Figure 11:
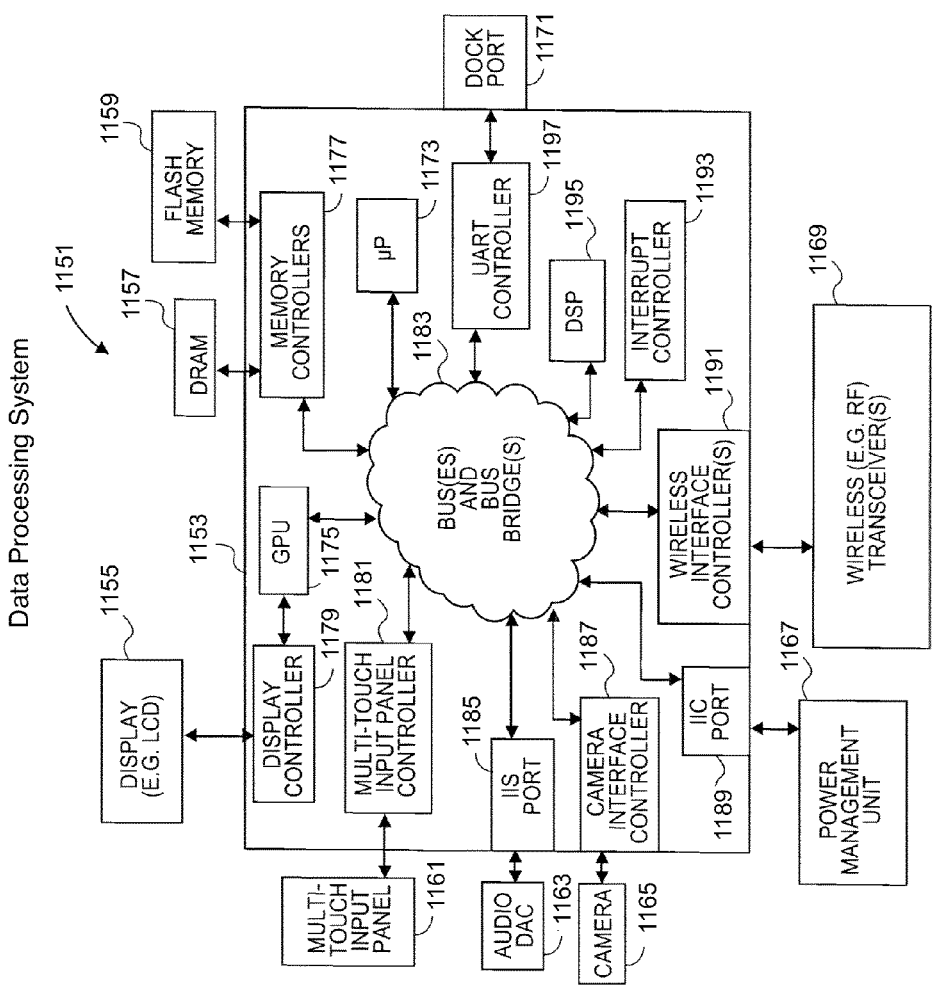
FIG. 11 is a block diagram illustrating an exemplary data processing system and associated devices, which can incorporate an embodiment of the nonvolatile memory system described herein.

FIG. 11 is a block diagram illustrating an exemplary data processing system and associated devices, which can incorporate an embodiment of the nonvolatile memory system described herein. The data processing system 1151 can implement the system 1153 as a system on a chip (SOC) integrated circuit or may implement the system 1153 as multiple integrated circuits coupled by one or more buses. The data processing system 1151 can include a plurality of components which are shown external to the system 1153 but which are otherwise coupled to the system 1153. Such components can include the dynamic random access memory (DRAM) 1157, the flash memory 1159, both of which are coupled to the memory controllers 1177. The flash memory 1159 can be implemented with one or more elements of the nonvolatile memory system 220 with managed I/O priority of FIG. 2, such as the memory device 224. Additionally, the memory controllers 1177 can include at least one embodiment of the memory controller 240 of FIG. 2.

Also coupled to the system 1153 is a dock port 1171, which is coupled via a UART controller 1197, and wireless (RF) transceivers 1169 which are coupled via one or more wireless interface controllers 1191. Additionally, a power management unit 1167 can couple to the system 1153 via an inter-integrated circuit (IIC) port 1189, a camera 1165 can couple via the camera interface controller 1187, an audio digital-to-analog converter (DAC) 1163 can couple via an integrated inter-chip sound (IIS) port 1185. A multi-touch input panel 1161 can couple to the system 1153 via the multi-touch input panel controller 1181, and a display device 1155, such as an LCD or LED device, can couple to the system 1153 via a display controller 1179. These various components provide input and output capabilities for the data processing system as is known in the art.

Additionally, the system 1153 can include a graphics processing unit 1175 and a microprocessor 1173 which can be, in certain embodiments, an ARM microprocessor, from ARM Holdings of Cambridge, United Kingdom and San Jose, Calif. In addition, the system can include a digital signal processor 1195 and an interrupt controller 1193. These various components can be coupled to one another via one or more buses and bus bridges 1183 which can be implemented in a variety of architectures. The wireless transceivers 1169 can include infrared transceivers, as well as radio frequency (RF) transceivers and can include one or more of such transceivers, such as a wireless cellular telephone transceiver, a Wi-Fi compliant transceiver, a long-term evolution (LTE) compliant transceiver, a Bluetooth compliant transceiver, or other types of wireless transceivers, such as a Near Field Communication (NFC) transceiver. In one embodiment, the wireless transceivers 1169 include a wireless cellular telephone transceiver, a Wi-Fi compliant transceiver (IEEE 802.11 A/G/N/AC transceiver), and a Bluetooth transceiver. Each of these wireless transceivers can be coupled to a respective wireless interface controller which can be one or more of a plurality of interface controllers, such as a UART controller or an IIS controller or an SDIO controller, etc. The data processing system 1151 may include further input/output devices, such as a keypad, or a keyboard, or a cursor control device, or additional output devices, etc.

It will be understood that the data processing system of FIG. 11 can be implemented in a variety of different form factors or enclosures, which package and embody the data processing system. For example, the data processing system can be implemented as a desktop computer, a laptop computer, a tablet computer, an embedded system, consumer product, a handheld computer, or other handheld device, such as a smartphone. In one embodiment, the data processing system of FIG. 11 is a Macintosh computer, iPhone, iPad, or iPod Touch device, all from Apple Inc. of Cupertino, Calif. The data processing system can be implemented to operate using of AC power or a combination of AC power and battery power or merely battery power in at least certain modes. The data processing system can include a cellular telephone and can have the form factor of a cellular telephone, such as a candy-bar style cellular telephone or a flip phone or a phone with a sliding keyboard, which slides out (e.g., from an enclosure) or swings out (e.g., from an enclosure) to expose the keys of the keyboard. In certain embodiments, the data processing system may be implemented in a tablet format of a small handheld computer, which includes wireless cellular telephony and Wi-Fi and Bluetooth wireless capability.

In the foregoing specification, the invention has been described with reference to specific embodiments thereof.

However, it will be evident that various modifications and changes can be made thereto without departing from the broader spirit and scope of the invention. The specification and drawings are, accordingly, to be regarded in an illustrative rather than a restrictive sense.

What is claimed is:

1. A memory system comprising:
an electrically erasable semiconductor memory, to store data;
a storage processor, coupled to the memory;
a command interface to receive multiple access requests for the memory, wherein the multiple access requests each include an external priority;
an expectation table, to store a latency expectation associated with each external priority; and
a mode selector, to select an operating mode for the storage processor, the operating modes including a normal mode and a preemption mode, the preemption mode to cause the storage processor to process the multiple access requests in an order based on the expectation table, the storage processor further to process a second access request having a second external priority before a first access request having a first external priority, wherein the first external priority is relatively higher than the second external priority and the second access request has a pendency period that exceeds the latency expectation associated with the second external priority.

2. The memory system of claim 1, wherein the normal mode to causes the storage processor to process the multiple access requests in an order determined by the external priority of the multiple access requests.

3. The memory system of claim 1, wherein the each of the multiple access requests is stored in a queue corresponding to the external priority of an access request of the multiple access requests.

4. The memory system of claim 3, wherein a read access request from the multiple access requests has a separate queue from a write access request from the multiple access requests.

5. The memory system of claim 4, wherein a read access request is processed before a write access request of equal priority.

6. The memory system as in claim 1, further comprising a device driver, to update the expectation table.

7. A non-transitory machine-readable medium storing instructions which, when executed by one or more processors of a data processing system, cause the one or more processors to perform operations to manage a set of priority queues for a storage processor, the operations comprising:
storing an I/O (input/output) operation into a priority queue of the set of priority queues based on a priority of the operation;
assigning an incoming timestamp to the I/O operation, the incoming timestamp indicating a start of a pendency period;
receiving an indicator to perform a mode evaluation operation for the storage processor, the mode evaluation operation including assessing a number of I/O operations stored in each priority queue of the set of priority queues;
determining to switch from a first operational mode to a second operational mode when the number of I/O operations stored in any priority queue exceeds a value;
switching from the first operational mode to a second operational mode responsive to the receiving of the indicator, the second operational mode including processing a first task associated with a first I/O operation, the first task having a first priority, processing a second task associated with a second I/O operation, the second task having a second priority; and
wherein the second task is processed before the first task, the first priority is relatively higher than the second priority, and the second task has a pendency period exceeding a latency expectation as defined by an expectation table.

8. The machine-readable medium of claim 7, wherein the first operational mode is a default operational mode.

9. The machine-readable medium of claim 8, wherein the first operational mode includes:
processing the first task associated with the first I/O operation before processing the second task associated with the second I/O operation.

10. The machine-readable medium of claim 7, wherein the expectation table includes the latency expectation corresponding to the first and second priority.

11. The machine-readable medium of claim 10, wherein the latency expectation corresponding to the first priority is shorter than the latency expectation corresponding to the second priority.

12. The machine-readable medium of claim 11, wherein a latency expectation defined by the expectation table is updated while the data processing system is operational.

13. A memory system comprising:
an electrically erasable semiconductor memory, to store data;
a storage processor, coupled to the electrically erasable semiconductor memory, the storage processor to process access requests for the electrically erasable semiconductor memory;
a command interface, to receive multiple access requests for the electrically erasable semiconductor memory, wherein each access request has a priority;
an updatable expectation table, to store an expectation value corresponding to a period in which an access request is to expected to be completed; and
a mode selector, to select an operating mode for the storage processor from a set of operating modes including a standard mode and a preemption mode, wherein the standard mode is to cause the storage processor to process the multiple access requests in order of priority and the preemption mode is to cause the storage processor to process the multiple access requests out of priority order based on a pendency period in relation to the expectation value stored in the expectation table, wherein the expectation table is further to store a first expectation value for a first priority and a second expectation value for a second priority, the first expectation value is shorter than the second expectation value, and the first priority is higher relative to the second priority.

14. The memory system as in claim 13, wherein an access request to read from the semiconductor memory has a higher internal priority than an access request to write to the semiconductor memory.

15. The memory system as in claim 13, wherein the multiple access requests each include a tag identifier, to identify the request, and to indicate the priority of the request.

16. A non-transitory machine-readable medium storing instructions which, when executed by one or more processors of a data processing system, cause the one or more processors to perform operations to manage a set of priority queues for a storage processor, the operations comprising:
storing an I/O (input/output) operation into a priority queue of the set of priority queues based on a priority of the operation;

assigning an incoming timestamp to the I/O operation, the incoming timestamp indicating a start of a pendency period;

receiving an indicator to perform a mode evaluation operation for the storage processor;

switching from a default first operational mode for the storage processor to a second operational mode of the storage processor responsive to the receiving of the indicator, wherein switching from the default first operational mode to the second operational mode responsive to the receiving of the indicator further comprises assessing a number of I/O operations stored in each priority queue of the set of priority queues and determining to switch from the default first operational mode to the second operational mode when the number of I/O operations stored in any priority queue exceeds a value;

wherein the default first operational mode includes processing a first task associated with a first I/O operation, the first task having a first priority and processing a second task associated with a second I/O operation, the second task having a second priority, wherein the first task is processed before the second task, and the first priority is relatively higher than the second priority; and wherein the second operational mode includes processing the first task associated with a first I/O operation, the first task having a first priority and processing the second task associated with a second I/O operation, the second task having a second priority, wherein the second task is processed before the first task, the first priority is relatively higher than the second priority, and the second task has a pendency period exceeding a latency expectation as defined by an expectation table.

17. The machine-readable medium of claim 16, wherein the expectation table includes the latency expectation corresponding to the first and second priority.

18. The machine-readable medium of claim 17, wherein the latency expectation corresponding to the first priority is shorter than the latency expectation corresponding to the second priority.

19. The machine-readable medium of claim 18, wherein a latency expectation defined by the expectation table is updated while the data processing system is operational.

* * * * *